Patented Apr. 27, 1943

2,317,725

UNITED STATES PATENT OFFICE 2,317,725

COATING AGENT

Kurt Billig, Frankfort-on-the-Main-Hochst, Germany; vested in the Alien Property Custodian No Drawing. Application October 14, 1939, Serial No. 299,521. In Germany September 24, 1938

1 Claim. (Cl. 260—32)

The present invention relates to coating agents.

Film-forming agents such as natural resins, artificial resins, cellulose derivatives and reaction products of caoutchouc are used to a great extent for the preparation of paintings, lacquer coatings, finishings and similar coating agents. A solution of the said substances is prepared in order to render them suitable for the intended use. Resins, for instance, are dissolved in organic solvents and the most different technical effects are obtained by painting the article with the solution or spraying the solution onto the article to be coated or by dipping the article into the solution. This process is relatively uneconomical, owing to the use of solvents, chiefly because it is hardly possible to recover the solvents.

It has, therefore, been attempted to replace the organic solvents by the non-dissolving water. The aqueous emulsions or suspensions were thus developed. The emulsions have the drawback that, on preparing and stabilizing them, emulsifying agents must be used which in most cases are contained in the unaltered state in the finished film and often have an unfavorable action therein. They particularly cause a sensitiveness to water of the film, even when the lacquer itself is fully hydrophobic. Moreover, since the emulsions contain small suspended particles, there exists the danger of a demixing. The dilution with water, too, has certain limits.

It has also been attempted to use film-forming substances which do not only emulsify in water but are more or less soluble. These are especially cellulose derivatives which, however, are in most cases insufficiently stable to water. Finally, processes are known according to which lacquer crude materials soluble in alkalies are used for the aforesaid purposes. Particularly suitable for leather finishings, lacquer coatings for hats and the like are solutions of shellac in aqueous alkali (borax). This natural resin, however, is a lacquer crude material of quite a specific constitution which conditions the said properties and which could hitherto not yet be reproduced in the case of any other natural or artificial resin. If other film-forming substances, natural or artificial resins are used which, on account of their content of hydroxyl and carboxyl groups, are soluble in aqueous alkalies, it is generally not possible to obtain water-proof coating agents with the aid of these substances. Thus it is known that colophony cannot be used instead of shellac for the preparation of water-proof finishings; phenol resins, even those which have been made soluble in weak alkalies such as sodium carbonate, ammonia or borax by introducing carboxyl groups, have likewise not the properties required.

Now I have found that it is possible to obtain water-proof coating agents (lacquer coatings, finishings and the like) by using aqueous solutions of interpolymerization products containing free carboxyl groups which solutions have been prepared by means of basic substances. The simplest representatives of this type are interpolymerization products of polymerizable compounds containing the group

with unsaturated acids. Instead of the interpolymerizates containing free carboxyl groups there may likewise be used, inter alia, the esters thereof, but in this case the ester groups must completely or partially be transformed into the free acid groups. Unsaturated compounds which may be used for the preparation of the interpolymerizates thus characterized are for instance: especially vinyl esters of carboxylic acids such as vinyl acetate, vinyl formate, vinyl propionate, vinyl butyrate; hydrocarbons such as styrene, butadiene and its derivatives, for instance beta-chlorobutadiene; vinyl ethers such as vinyl methyl ether, vinyl isobutyl ether; acrylic acid esters such as the methyl ester, the ethyl ester, the propyl ester; acrylonitrile, methacrylic acid esters such as the methyl ester and the ethyl ester; vinyl chloride or mixtures of these compounds. Unsaturated acids to be used are especially the monobasic carboxylic acids, in the first line crotonic acid, furthermore acrylic acid, methacrylic acid, cinnamic acid and the like. Reaction products of the polymerizates may likewise be used, for instance the acetal carboxylic acids obtained from the interpolymerizates of vinyl acetate and crotonic acid by saponification and acetalization.

Suitable interpolymerization products for the coating agents are described, for instance, in the copending U. S. applications Serial No. 203,608 filed April 22, 1938 in the name of Werner Starck and Kurt Billig, for "Interpolymerization products," and Serial No. 210,164 filed May 26, 1938, in the name of Heinrich Hopff, Werner Starck and Kurt Billig, for "Interpolymerization products." Especially valuable are the interpolymerization products of at most one mol of crotonic acid with at least one mol of the other polymerizable compound, especially of a vinyl ester of a carboxylic acid. If there are used interpolymerizates of vinyl acetate with crotonic acid the proportion of vinyl acetate to crotonic acid is preferably chosen as between about 90 to 10 and 98 to 2.

Lacquer solutions yielding waterproof lacquer coatings and finishings are prepared by dissolving the said interpolymerization products containing free carboxyl groups in the volatile nitrogen bases such as ammonia or volatile amines such as mono-, di-, trimethylamine as well as ethyl amine. These lacquers probably lose a large portion of their basic constituents on drying so that the solubility in water of the film is still decreased thereby.

The aqueous solutions described of these numerous compounds may quite generally be used in all cases where hitherto solutions in organic solvents or emulsions were used. The most favorable conditions may easily be ascertained according to each special use. For instance, it may readily be determined how many acid groups must be present in each single case for attaining an optimum effect.

The following examples serve to illustrate the invention, but they are not intended to limit it thereto:

(1) There is used an interpolymerization product of vinyl acetate and crotonic acid mixed in a proportion of 90 to 10. The interpolymerization product may be prepared as follows: A solution of crotonic acid in vinyl acetate, to which a peroxide such as benzoyl peroxide has been added, is run into water of about 70° C. to 80° C. in which small portions of sodium polyacrylate and secondary sodium phosphate have been dissolved. A short time after the entire quantity has been introduced the polymerization is complete. The beadlike interpolymerization product is filtered with suction or centrifuged, washed and dried. It dissolves readily in ammonia without leaving a residue; there may be used the calculated quantity, an excess or a deficiency of ammonia.

When this solution is spread on a base and allowed to dry either at room temperature or, more rapidly, at a raised temperature, a clear solid hard film is formed which, in contradistinction to the starting material, does not dissolve in water but has become water-proof like pure polyvinyl acetate. It is resistant to benzine and mineral oils. This film may also be prepared in a soft and elastic form by introducing a softening agent into the aqueous solution of the ammonium salt, preferably by means of a rapid stirrer in order to attain a rapid and uniform distribution of the softening agent. As softening agents there may, for instance, be used phthalic acid dibutyl ester and tricresyl phosphate. Finely subdivided solid substances such as dyes and pigments may likewise be intermixed.

The viscosity of the ammonium salt solutions may be varied within wide limits. The viscosity is increased by using an excess of ammonia or by stirring in solvents which are not miscible with water such as toluene.

The aqueous solutions of the ammonium salts, with or without a softening agent and with or without a nonsolvent, are well miscible with latex and synthetic emulsions, for instance with the emulsions of the polyvinyl esters, polyacrylic acid esters or the interpolymerization products thereof.

By all these properties manifold uses of the products are possible.

Pasteboard boxes may thus be impregnated with the solutions which, after an intensive drying, yield coatings which render the pasteboard boxes suitable as containers for benzine and mineral oils.

The ammonium salt solutions may also be used as binding agents for wall paintings. By the addition of pigments coating agents may be prepared from the solutions mixed with softening agents which coating agents may easily be applied to tissues by means of a spatula so as to obtain darkening fabrics.

The proportion of vinyl acetate to crotonic acid of 90 to 10 leads to films which become insoluble in water without drying in the heat. The invention is not limited to these proportions however as the use of 2 to 3 per cent of crotonic acid is already sufficient for obtaining a resin soluble in aqueous ammonia.

For dissolving this resin there is preferably used an excess of ammonia. The ammonia may also be replaced by organic nitrogen bases, for instance by methylamine.

Furthermore, it is possible to interpolymerize further unsaturated compounds together with the mixture of vinyl acetate and crotonic acid or to replace the vinyl acetate by such a compound whereby the same or similar possibilities of use are given. It is especially easy to intermix other vinyl esters such as vinyl formate, vinyl butyrate, vinyl chloracetate, vinyl butoxyacetate, vinyl stearate. In some of these cases new effects are observed, for instance the resins containing interpolymerized vinyl stearate are especially hydrophobic.

(2) There are used the ammonium salt solutions of the resinic acids obtained by the interpolymerization of vinyl acetate, acrylic acid ethyl ester and free acrylic acid or the salts thereof. By using 50 per cent of vinyl acetate, 40 per cent of acrylic acid ethyl ester and 10 per cent of acrylic acid films are obtained which are soft and elastic even without the addition of any softening agent.

(3) There are used in a similar manner as in Example 1 interpolymerization products which are obtained by the common polymerization of acrylic acid esters and acrylic acid or the salts thereof. The aqueous ammonium salt solutions yield films of great softness. The ammonium salt solutions of these interpolymerization products may be used with great advantage in admixture with those of vinyl acetate and crotonic acid. Films are obtained which are likewise sufficiently elastic without the addition of a softening agent.

(4) There are used the aqueous ammonium salt solutions of interpolymerization products of styrene and methacrylic acid; their behavior is similar to that of the interpolymerization products of Example 1.

I claim:

A coating composition comprising an aqueous solution of the ammonium salt of an interpolymerization product of about 90 to 98 per cent of vinyl acetate with about 2 to 10 per cent of crotonic acid, which when applied and dried gives a clear, solid, hard, water-proof film, insoluble in water and resistant to benzine and mineral oils.

KURT BILLIG.